UNITED STATES PATENT OFFICE.

RAYMOND A. HALL, OF DAYTON, OHIO.

SOLDERING COMPOUND.

No. 845,948.                Specification of Letters Patent.         Patented March 5, 1907.

Application filed November 22, 1906. Serial No. 344,629.

*To all whom it may concern:*

Be it known that I, RAYMOND A. HALL, a citizen of the United States, residing at Dayton, in the county of Montgomery and State of Ohio, have invented certain new and useful Improvements in Soldering Compounds; and I do declare the following to be a full, clear, and exact description of the invention, such as will enable others skilled in the art to which it appertains to make and use the same.

My invention is an improved soldering compound adapted for use in soldering aluminium by means of tin, as hereinafter described and claimed.

My improved soldering compound consists of stearic acid, sixty per cent.; mutton tallow, twenty-five per cent.; lard, (pure,) ten per cent.; paraffin-wax, five per cent. These are melted together, allowed to cool, and granulated.

In order to solder aluminium, the same may be cleaned by scraping where it is to be soldered. The compound is then applied, and pure tin is used as the soldering metal and is applied by means of an ordinary soldering-iron in the usual way. The compound acts as a flux.

Having thus described my invention, what I claim as new, and desire to secure by Letters Patent, is—

The herein-described soldering compound, consisting of stearic acid, mutton tallow, lard and paraffin-wax, substantially in the proportions specified.

In testimony whereof I have hereunto set my hand in presence of two subscribing witnesses.

RAYMOND A. HALL.

Witnesses:
  E. C. FISCHBACH,
  M. S. BENN.